United States Patent
Rapp

(10) Patent No.: US 8,908,265 B2
(45) Date of Patent: Dec. 9, 2014

(54) OPTICAL FIBER AMPLIFIER COMPRISING AN EMBEDDED FILTER AND A CONTROL METHOD WITH IMPROVED FEEDFORWARD CONTROL PERFORMANCE

(75) Inventor: Lutz Rapp, Deisenhofen (DE)

(73) Assignee: Xieon Networks S.a.r.l., Luxembourg (LU)

( * ) Notice: Subject to any disclaimer, the term of this patent is extended or adjusted under 35 U.S.C. 154(b) by 331 days.

(21) Appl. No.: 13/394,240

(22) PCT Filed: Sep. 4, 2009

(86) PCT No.: PCT/EP2009/006450
§ 371 (c)(1),
(2), (4) Date: Apr. 5, 2012

(87) PCT Pub. No.: WO2011/026502
PCT Pub. Date: Mar. 10, 2011

(65) Prior Publication Data
US 2012/0182602 A1    Jul. 19, 2012

(51) Int. Cl.
*H04B 10/29* (2013.01)
*H04B 10/296* (2013.01)
*H04B 10/294* (2013.01)

(52) U.S. Cl.
CPC .......... *H04B 10/296* (2013.01); *H04B 10/2941* (2013.01)
USPC .................................... 359/341.43; 359/337.1

(58) Field of Classification Search
CPC .......................... H04B 10/296; H04B 10/2941
USPC ......................................... 359/341.43, 337.1
See application file for complete search history.

(56) References Cited

U.S. PATENT DOCUMENTS

| 5,818,629 | A | * | 10/1998 | Kinoshita | ................. 359/337.11 |
| 6,052,221 | A | * | 4/2000 | Terahara | .................. 359/337.11 |
| 6,144,485 | A | | 11/2000 | Sugaya et al. | |
| 6,151,158 | A | | 11/2000 | Takeda et al. | |
| 6,163,399 | A | | 12/2000 | Berg | |
| 6,341,034 | B1 | | 1/2002 | Sun et al. | |

(Continued)

FOREIGN PATENT DOCUMENTS

| EP | 0 897 205 A2 | 2/1999 |
| EP | 1 458 065 A1 | 9/2004 |
| WO | 03/007023 A2 | 1/2003 |
| WO | 2005/057813 A1 | 6/2005 |

OTHER PUBLICATIONS

Lee et al., Effective suppression of signal-wavelength dependent transients in a pump-controlled L-band EDFA, OFC 2004, vo. 2, Jan. 1, 2004, pp. 1-3, XP 009134229, p. 1, 1. Introduction, p. 3, 3. Summary figure 2.

*Primary Examiner* — Ari M Diacou
(74) *Attorney, Agent, or Firm* — Nelson Mullins Riley & Scarborough LLP

(57) ABSTRACT

An optical amplifier with improved transient performance has two amplifier stages and a gain flattening filter-inserted between the amplifier stages. A control unit generates a pump control signal for a common pump source pumping both amplifier stages. The pump control signal has a feed-forward component and a feedback component. After a drop of channels the feed-forward control circuit is responsible for the transient performance and fast gain stabilization. The characteristic of the gain flattening filter is taken into account in calculating an optimum feed-forward control signal.

14 Claims, 2 Drawing Sheets

(56) References Cited

U.S. PATENT DOCUMENTS

| | | | |
|---|---|---|---|
| 6,366,393 B1* | 4/2002 | Feulner et al. | 359/337 |
| 6,396,625 B1* | 5/2002 | Nakaji | 359/341.41 |
| 6,483,632 B1* | 11/2002 | Jolley et al. | 359/337.4 |
| 6,661,570 B2* | 12/2003 | Nakaji | 359/341.41 |
| 6,690,506 B2* | 2/2004 | Zahnley et al. | 359/337.11 |
| 6,757,099 B2* | 6/2004 | Pavel et al. | 359/341.4 |
| 7,038,841 B2 | 5/2006 | Chang et al. | |
| 7,145,717 B2* | 12/2006 | Nakata et al. | 359/341.41 |
| 7,336,415 B2* | 2/2008 | Kakui et al. | 359/337.1 |
| 7,453,627 B2 | 11/2008 | Rapp | |
| 7,483,205 B1* | 1/2009 | Lundquist et al. | 359/341.3 |
| 2002/0067538 A1* | 6/2002 | Sugaya et al. | 359/337.12 |
| 2002/0176156 A1* | 11/2002 | Zahnley et al. | 359/341.4 |
| 2002/0186460 A1* | 12/2002 | Lelic | 359/341.4 |
| 2002/0196528 A1* | 12/2002 | Jolley et al. | 359/337.1 |
| 2003/0035206 A1 | 2/2003 | Pavel et al. | |
| 2003/0184851 A1* | 10/2003 | Tian et al. | 359/341.4 |
| 2004/0091263 A1* | 5/2004 | Sakamoto | 398/45 |
| 2004/0114215 A1* | 6/2004 | Tian et al. | 359/341.41 |
| 2005/0270635 A1* | 12/2005 | Shukunami et al. | 359/337 |
| 2006/0087723 A1* | 4/2006 | Takeyama et al. | 359/337 |
| 2008/0037109 A1* | 2/2008 | Rapp | 359/337.1 |
| 2008/0204860 A1* | 8/2008 | Rapp | 359/341.3 |
| 2010/0245986 A1* | 9/2010 | Qiao | 359/337 |
| 2011/0141552 A1* | 6/2011 | Ghera et al. | 359/334 |

\* cited by examiner

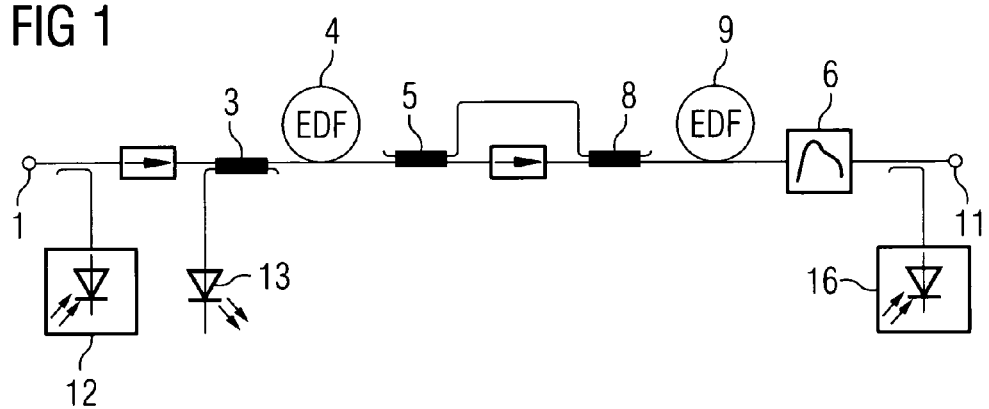
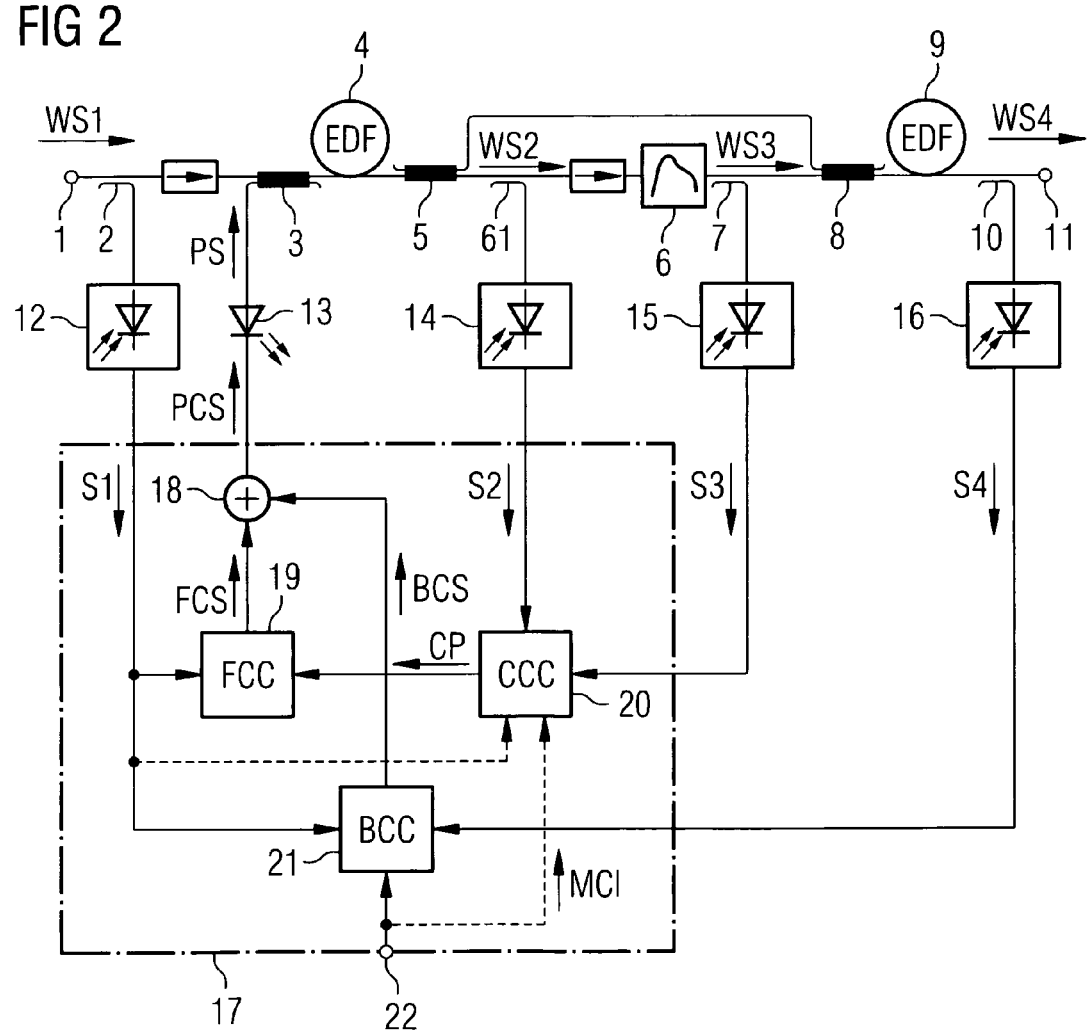

OPTICAL FIBER AMPLIFIER COMPRISING AN EMBEDDED FILTER AND A CONTROL METHOD WITH IMPROVED FEEDFORWARD CONTROL PERFORMANCE

FIELD OF THE INVENTION

The invention refers to an optical fiber amplifier comprising an embedded filter and a control method with improved feed-forward control.

BACKGROUND OF THE INVENTION

Optical fiber amplifiers are widely used for signal amplification in optical data transmitting networks based on wavelength-division multiplexing (WDM). Changes in network configuration, component failures, fiber breaks or protection switching can cause abrupt changes of optical input power. These changes cause fast changes of the average power levels of the surviving channels at the output of the amplifiers. Furthermore, such changes can be transferred to other wavelengths due to nonlinear fiber effects and the non-ideal dynamic properties of erbium-doped fiber amplifiers (EDFAs). These changes can propagate to other sites leading to optical power fluctuations across the whole network and possibly to oscillations. Thus, even channels that are not directly affected by the switching operations or failures can suffer from some performance degradation at the receivers.

Furthermore, gain variations can also accumulate in a cascade of amplifiers. Thus, even small gain variations can result in significant power changes at the receivers. Therefore, efficient amplifier control techniques are required that allow to keep the inversion and as a consequence the gain profile of an amplifier or an amplifier stage relatively constant even if the input power changes.

Fast electronic control architectures are currently the most economical solution to stabilize the gain of EDFAs. Commonly, feedback architectures are used since they allow to adjust the gain or output power to given target values and to compensate for control errors. However, purely feedback based controllers cannot meet the transient performance requirements for dynamically reconfigured networks. Fortunately, feedback controllers can be complemented by a feedforward controller. The combination of the two types of controllers provides fast response to any changes with the feedback system cleaning up for any error in the predetermined adjustment made by the feedforward control.

In order to keep the gain variations as small as possible, the feedforward control has to predict as accurately as possible the pump power required to keep the inversion constant for the changed input power conditions. Typically, the required pump power is estimated to be a linear function of the input power plus some offset. However, this approach neglects the influence of wavelength, which can lead to significant deviations between calculated pump power and actually required pump power.

An approach to alleviate this problem is described in the patent U.S. Pat. No. 6,341,034 B1. The described solution consists of an additional monitoring path at the amplifier input comprising an additional optical filter and succeeding means to measure the optical power after the filter. This adds some cost to the amplifier. However, the main drawback of the solution is the increased loss in the signal path at the input of the amplifier due to the increased power that has to be coupled out.

The patent EP 1 695 467 B1 discloses a method for improving the transient performance by a feedforward control taking into account that the required pump power depends on the wavelength of the surviving channels in a drop process. The main advantage of this solution is that this is achieved without adding some additional components to a standard amplifier design. However, the solution adds some complexity to the control software and increases the efforts required for amplifier calibration.

Amplifiers used for commercial applications typically consist of several stages, even if there is no access port between them. In many cases, the stages are separated by an isolator that reduces backward travelling amplifier spontaneous emission and thus contributes to improve noise figure.

In principle, the power required for signal amplification in the different stages could be provided by pumps dedicated to one stage each. However, cost reduction has become a continuing task. Therefore, pump power bypassing or pump power splitting has become a widely used technique to reduce amplifier cost. If pump power splitting is applied to amplifier stages that are separated by a component afflicted with delay such as a dispersion compensating fiber (DCF) unacceptable poor transient performance is gained. Therefore, pump splitting is typically applied only to stages that are all before the DCF or after the DCF.

OBJECTS AND SUMMARY OF THE INVENTION

Therefore, it is an object of the present invention to provide a fiber amplifier with improved feedforward control performance by taking into account wavelength dependence without adding significant complexity to the amplifier design. In particular, no additional optical filter shall be used.

The invention refers to an optical amplifier with
- a first amplifier stage receiving an input signal and a second amplifier stage connected in series and outputting an output signal;
- an optical gain flattening filter inserted between said amplifier stages;
- at least one pump source generating a pump signal;
- a control unit determining the power of the pump signal, the control unit comprising
  - a correction unit receiving a filter input measuring signal and a filter output measuring signal representing measured input and output power levels of the optical gain flattening filter, determining correction parameters from at least the filter measuring signals according to filter attenuation values, and
  - a feedforward control circuit receiving an input measuring signal derived from an optical amplifier input signal and the correction value for calculating an feedforward control signal according to the input power of the amplifier input signal and the correction value.

The presented technique takes into account the wavelength dependence by doing calculations. The advantages and disadvantages of this approach are:
Significant reduction of overshoots is gained without need for a powerful digital signal processor and only small additional effort for calibration and additional optical components with only marginal cost are needed.

The invention can be used for different amplifier designs and can also be combined with other control methods improving transient performance.

To allow fast reaction to a drop of channels the feedforward calculation circuit (19) calculates the feedforward control signal FCS according to $FCS = A \cdot P_{IN} + B + \alpha \cdot CP(FA) \cdot P_{IN}$. In this equation, the first two terms provide an average value for the required pump power. The third term performs some correction and introduces the wavelength dependence in this equation.

According to technical requirements it is usually necessary that the control unit is adapted for controlling in addition amplifier gain and/or output power by a feedback control.

The combination of the feedforward with a feed backward control enables fast and exact gain or power control.

It is advantageously that the feedforward correction calculation unit is designed for incorporating the power of the amplifier input signal when determining the correction parameter.

Because the correction parameter is slightly different for different input powers considering the input power of a remaining channel allows a more precise determination of the variation parameter.

Adaptable to network requirements is a control unit implemented as programmable processor receiving the electrical measuring signals derived from the input signal and output signal respectively.

Cost reduction is possible if a common pump source for both amplifier stages is used.

The invention refers further to a method for controlling an optical fiber amplifier with at least two amplifier stages, a gain flattening filter inserted between the stages and a pump source, by
- measuring an input power and an output power of the gain flattening filter;
- measuring an input power of the amplifier;
- determining a feedforward control signal according to an attenuation of the gain flattening filter derived from the input power and output power of the gain flattening filter and the amplifier input power; and
- controlling a pump power of the pump source by the feedforward control signal.

More details of the invention are described in further remaining dependent claims.

BRIEF DESCRIPTION OF THE DRAWINGS

A presently preferred example of the invention is described below with reference to accompanying drawings, where FIG. 1 shows a simplified bloc diagram of a typical fiber amplifier, FIG. 2 shows a simplified block diagram of a fiber amplifier with corresponding control components.

Figure 3:
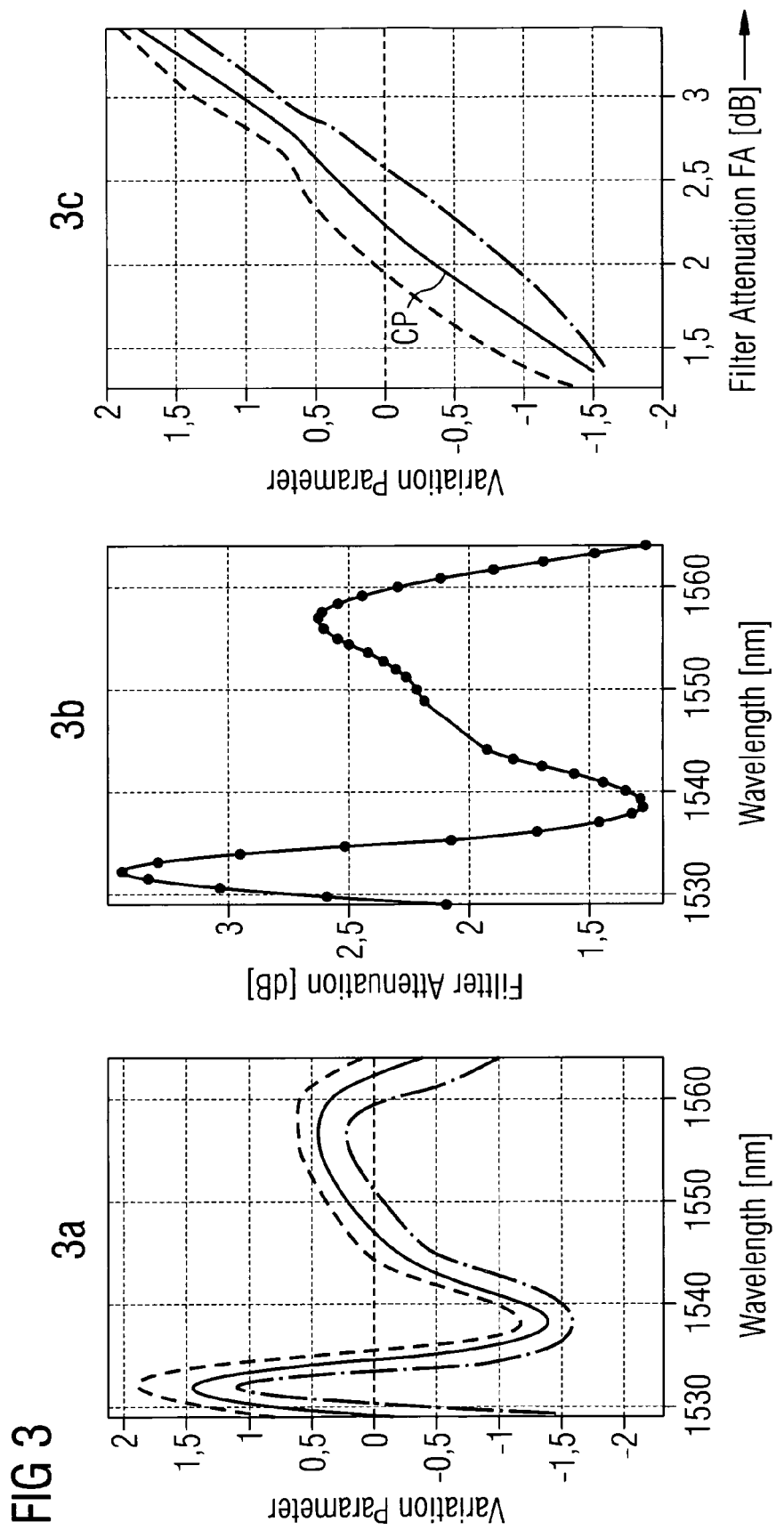
FIG. 3 shows three plots.

3a shows a diagram of the variation parameter as a function of the wavelength, 3b shows the filter attenuation as a function of the wavelength, and 3c shows the variation parameter as a function of the attenuation derived from diagrams 3a and 3b.

DETAILED DESCRIPTION OF THE INVENTION

FIG. 1 illustrates a simplified block diagram of a typical fiber amplifier (EDFA). The figure shows also details of the fiber amplifier like some isolators, which are not part of the invention.

The fiber amplifier comprises two amplifier stages 4 and 9 represented by doped fibers (EDF) connected in series. An optical gain flattening filter (GFF) 6 is connected to the output of the second amplifier stage 9. A first isolator at the amplifier input 1 and a second isolator between the two stages reduce backward travelling amplifier spontaneous emission and thus help to improve the noise figure of the complete setup. The signals at the input 1 and output 11 are measured and a pump source 13 is controlled to achieve constant gain. Further elements of the amplifier are explained in the description of FIG. 2.

FIG. 2 illustrates a simplified block diagram of a fiber amplifier (EDFA) according to the invention. Again, the amplifier may also comprise additional elements like isolators, which are not part of the invention.

This fiber amplifier has also two amplifier stages connected in series, which are again represented by the first and the second doped optical fiber (EDF) 4 and 9. In contrast to the typical amplifier setup, the optical gain flattening filter (GFF) 6 is inserted between said amplifier stages. This is an important aspect—the invention does not work for a GFF placed at the amplifier output.

In this embodiment both amplifier stages are also pumped by the single pump source 13. A pump signal PS is inserted via a pump coupler 3 into the first doped fiber 4. After the forward pump signal has passed through the first doped fiber 4 a reduced pump signal with residual pump power is inserted as into the second doped fiber 9. To avoid pump power losses, the reduced pump signal is passed by the second isolator and the optical GFF via a wavelength division demultiplexer 5 and a wavelength division multiplexer 8. Due to the high losses of isolators outside of the wavelength band, such a bypass is also used in arrangements without an embedded filter between the two stages. The stages may be also pumped forward or backward via a power splitter from the single pump source or via different pump sources.

In the illustrated embodiment, a control unit 17 outputs a pump control signal PCS, which is fed to the single pump source 13 which generates a required pump power.

The control unit 17 makes use of feedforward control and feedback control. The illustrated feedforward control comprises a feedforward control circuit (FCC) 19 and a correction parameter calculation circuit (CCC) 20 as an essential part of the invention. The correction parameter calculation circuit 20 receives an electrical filter input measuring signal S2 and an electrical filter output measuring signal S3 respectively derived from a GFF input signal WS2 and a GFF output signal WS3. These measuring signals are coupled out by a second and a third power splitters 61 and 7 and then converted by optical-electrical converters (photo diodes) 14 and 15 into an electrical filter input measuring signal S2 and a filter output measuring signal S3. The correction parameter calculation circuit 20 calculates a filter attenuation FA from these measuring signals and determines a correction parameter CP, e.g. according to lookup tables. Details will be explained further down. The correction parameter CP and the input measuring signal S1 are fed to the feedforward control circuit (FCC) 19, which outputs a feedforward control signal FCS. Especially after a drop of channels the feedforward control is responsible for the transient performance and fast gain stabilisation.

A feedback control loop comprises a first power splitter 2, arranged between an amplifier input 1, the pump coupler 3, and a fourth splitter 10 arranged between an output of the second doped fiber 9 and the amplifier output 11. The control unit 17 further comprises a first optical-electrical converter 12 and a fourth optical-electrical converter 16 converting an amplifier input signal WS1 and an amplifier output signal WS4 into an electrical input measuring signals S1 and an electrical output measuring signal S4 respectively, which are fed to a feedback control circuit (BCC) 21. The shown feedback control is only an example which may be adapted according to different requirements. The feedback control circuit 21 generates a feedback control signal BCS. This signal is combined with the feedforward control signal FCS by an adder 18 correcting the feedforward control signal. The resulting pump control signal PCS controls the pump source 13 and therefore signal amplification. As usually, the feedback control optimizes the gain control. If the control signals are e.g. digital values, a converter generating the pump signal is inserted between the adder 18 and the pump source 13.

The drawing FIG. 2 represents only functional units. The control unit 17 may be designed as programmable processor unit allowing easy adaptation to network requirements.

Power drops constitute the most critical transient scenarios in optical networks since they can result from accidental events such as fiber cuts or malfunctions of network elements and the induced power changes are not predictable. Therefore, the following considerations focus on the power drops.

The feedforward component of the pump power or the proportional feedforward pump control signal FCS, respectively, is calculated as follows. First, a starting value $P_{FFS}$ of the feedforward pump signal component is determined by using the standard linear approach:

$$P_{FFS} = a \cdot P_{IN} + b \qquad (1)$$

with
$P_{FFS}$—feedforward pump power component, expressed in [mW];
a—constant factor; $P_{IN}$—amplifier input power; b—offset power value [mW].

Expressed in terms of the required feedforward control signal FCS controlling the pump 13, this equation can be written in modified form as $$FCS_S = A \cdot S1 + B \qquad (2)$$

with
$P_{FFS} \sim FCS_S$;
A—constant factor; S1—amplifier input measuring signal [mA];
B—offset current value [mA].

The calibration of the linear function is done in such a way that it predicts the average pump power required for different combinations of surviving wavelengths within the considered band.

For simplicity, the parameters a, b, and A, B are assumed to be constant. However, these parameters can also be adapted to the different operating conditions of the amplifier.

In a next step, a correction is applied to the terms A·S1+B by taking into account wavelength dependence. The correction term is governed by the already mentioned correction parameter CP depending on the GFF 6 attenuation FA and a measured total amplifier input power. As mentioned before, the correction parameter CP or written as function CP(FA) of the filter attenuation FA is calculated or determined by the correction calculation circuit (CCC) 20 from the power levels measured before and after the GFF. The measured attenuation strongly depends on the spectral shape of the signal at the input of the filter, although the filter function itself is not varied.

In summary, the FCC 19 calculates the feedforward pump power according to $$P_{FF} = a \cdot P_{IN} + b + CP(FA) \cdot P_{IN} \qquad (3)$$

respectively the feedforward control signal according to $$FCS = A \cdot S1 + B + \alpha \cdot CP(FA) \cdot S1 \qquad (4)$$

where $P_{PFF} \sim FCS$; FA—filter attenuation; S1—amplifier input measuring signal; $P_{IN}$—total amplifier input power. The factors A, α and term B provide the correlation between power levels and current control values (instead of current values the terms may also represent digital values).

In order to demonstrate the performance of this technique, a large number of drop scenarios have been considered by means of simulations. For each scenario, it has been assumed that 40 channels are launched into the amplifier before some channels are dropped. However, the scenarios are different with respect to the number of surviving channels, the output power of the amplifier and/or the wavelengths of the surviving channels. The amplifier output power before the drop takes place has been varied in the range from 0 dBm to 15 dBm.

For each of the scenarios (all combination of 1-40 channels), the exact pump power RPP(λ) required to keep the gain of the amplifier constant has been determined. Furthermore, an average pump power value APP has been calculated by considering all scenarios with identical input power.

A variation parameter $$VP = (RPP(\lambda) - APP) / P_{IN} \qquad (5)$$

with
$P_{IN}$—representing the total input power;
RPP(λ) is introduced that indicates relative deviations from the average required pump power for a remaining channel with wavelength λ.

The diagram 3a shows the variation parameter VP versus wavelength λ of the single remaining channel for different input powers $P_{IN}$ (respectively output powers in the range from 0 dBm to 15 dBm). Only three graphs—solid, dashed and dotted lines—for three different channel input powers are shown. In case of an ideal feedforward control, these variation parameters should be identical with the correction parameters CP.

The diagram 3b indicates the attenuation provided by the GFF 6 for the different channel frequencies. The curves in both plots show similar behaviour. Therefore plots 3a and 3b suggest that there is an unambiguous relation between the variation parameter and the attenuation provided by the filter.

According to diagram 3c the variation parameter for each of the considered drop scenarios has been plotted versus attenuation of the GFF 6 in order to get an idea of the remaining error after the channel drop. Obviously, the filter attenuation is a useful parameter to calculate the variation parameter VP and, as a consequence, the correction parameter CP—straight line—versus the measured attenuation is determined, and e.g. stored in a lookup table. In a simple implementation, the correction parameter CP is a linear function of the attenuation provided by the GFF to the signal expressed in logarithmic units [dB]. For channels outside of a wavelength range from 1530 nm to 1560 nm, the accuracy of the correction value is significantly reduced (not shown). However, only few systems make use of channels below 1530 nm.

In order to keep the implementation effort small, a solution has been described for which the correction parameter CP depends only of the filter attenuation derived from the measured filter input measuring signal S2 and the filter output measuring signal S3. However, the calculation of the required pump power can be improved by taking additional parameters such as input power (e.g. CP(FA, $P_{IN}$), number and/or wavelength of channels et cetera into account when calculating correction parameter CP. The necessary management information MCI may be received from a management system or a supervisory system.

The present invention is not limited to the details of the above described principles. The scope of the invention is defined by the appended claims and all changes and modifications as fall within the equivalents of the scope of the claims are therefore to be embraced by the invention. Especially analogue control processing can be substituted by digital data processing and vice versa. Also mathematical conversions or calculations of the control signals and correction values based on the inventive method are incorporated.

REFERENCE SIGNS 1 amplifier input
2 first power splitter
3 pump coupler
4 first amplifier stage
5 dichronic splitter
6 gain flattening filter
61 second power splitter
7 third power splitter
8 waveguide
9 second amplifier stage
10 fourth power splitter
11 amplifier output
12 first electrical-optical converter
14 second electrical-optical converter
15 third electrical-optical converter
16 fourth electrical-optical converter
17 control unit
18 adder
19 feedforward control circuit (FCC)
20 CP calculation circuit (CCC)
21 feedback control circuit (BCC)
22 channel information input (target value)
WS1 amplifier input signal
WS2 filter input signal
WS3 filter output signal
WS4 amplifier output signal
S1 input measuring signal
S2 filter input measuring signal
S3 Filter output measuring signal
S4 amplifier output measuring signal
BCS feedback control signal
FCS feedforward control signal
BCS feedback control signal
PCS pump control signal
PS pump signal
MCI management channel information
$P_{FF}$ feedforward pump power component
$P_{FFS}$ feedforward pump power component startwert
VP variation parameter
CP correction parameter
FA filter attenuation
BCC feedback control circuit
FCC feedforward control circuit
CCC correction calculation circuit

The invention claimed is:

1. An optical fiber amplifier with improved transient performance, comprising:
   a first amplifier stage receiving an amplifier input signal and a second amplifier stage connected in series with said first amplifier stage and outputting an amplifier output signal;
   an optical gain flattening filter inserted between said first and second amplifier stages;
   at least one pump source generating a pump signal;
   a control unit connected to said pump source and determining a power of the pump signal, said control unit having:
   a correction parameter calculation unit receiving measured power levels of a filter input measuring signal and a filter output measuring signal representing measured input and output power levels of said optical gain flattening filter, determining correction parameters from at least the filter measuring signals according to filter attenuation values; and
   a feed-forward control circuit receiving an input measuring signal derived from an optical amplifier input signal and a correction parameter for calculating a feed-forward control signal acting on the power of said pump signal according to the input power of the amplifier input signal and the correction parameter.

2. The optical amplifier according to claim 1, wherein said feed-forward calculation circuit is configured to calculate the feed-forward control signal according to:

$$FCS = A\ S1 + B + \alpha CP(FA)S1,$$

where A, α are constant factors;
S1 is the amplifier input measuring signal[mA];
B is an offset current value;
where $P_{FF} \sim FCS$, $P_{FF}$ is a feed-forward pump power component;
CP is a correction parameter; and
FA is a filter attenuation.

3. The optical amplifier according to claim 2, further comprising a correction calculation circuit configured for calculating a correction parameter as a function of a measured attenuation of the gain flattening filter.

4. The optical amplifier according to claim 3, wherein said correction calculation circuit is configured to incorporate a power ($P_{IN}$) of the amplifier input signal when determining the correction parameter.

5. The optical amplifier according to claim 3, wherein said correction calculation circuit is configured for taking into account a number and/or an influence of a wavelength of the remaining channels.

6. The optical amplifier according to claim 5, wherein said correction calculation circuit is configured for receiving management channel information and determining the correction parameter considering active channels.

7. The optical amplifier according to claim 1, wherein said control unit further comprises a feedback control circuit for controlling in addition amplifier overall gain and/or amplifier output power.

8. The optical amplifier according to claim 5, wherein said control unit further comprises a feedback control circuit for controlling in addition amplifier overall gain and/or amplifier output power.

9. The optical amplifier according to claim 1, wherein said control unit is implemented as a programmable processor receiving electrical filter measuring signals from the input and the output of said gain flattening filter and in addition measuring signals derived from the amplifier input signal and the amplifier output signal respectively.

10. The optical amplifier according to claim 5, wherein said control unit is implemented as a programmable processor receiving electrical filter measuring signals and in addition electrical amplifier measuring signals derived from the amplifier input signal and the amplifier output signal respectively.

11. The optical amplifier according to claim 1, wherein said pump source is a common pump source for pumping said first and second amplifier.

12. The optical amplifier according to claim 5, wherein said pump source is a common pump source for pumping said first and second amplifier.

13. A method for controlling an optical fiber amplifier with at least two amplifier stages, a gain flattening filter inserted between said amplifier stages, and a pump source, the method which comprises:

measuring an input power and an output power of the gain flattening filter;

measuring an input power of the amplifier;

determining a feed-forward control signal according to an attenuation of the gain flattening filter derived from the input power and output power of the gain flattening filter and the amplifier input power; and controlling a pump power of the pump source by the feed-forward control signal.

14. The method according to claim 13, which comprises further controlling the gain or power of the optical fiber amplifier in addition by feedback control.

* * * * *